United States Patent
Lu et al.

(10) Patent No.: US 12,244,210 B2
(45) Date of Patent: Mar. 4, 2025

(54) CONVENIENT HUMAN AND ANIMAL POWER DRIVE PERMANENT MAGNET POWER GENERATION AND STORAGE SYSTEM

(71) Applicant: Hefei Zhuanwei Intelligent Technology Co., Ltd., Anhui (CN)

(72) Inventors: Yifei Lu, Anhui (CN); Feng Lu, Anhui (CN); Hao Wei, Anhui (CN); Tong Zhang, Anhui (CN); Yuanzhe Ge, Anhui (CN)

(*) Notice: Subject to any disclaimer, the term of this patent is extended or adjusted under 35 U.S.C. 154(b) by 318 days.

(21) Appl. No.: 18/070,793

(22) Filed: Nov. 29, 2022

(65) Prior Publication Data
US 2024/0146148 A1 May 2, 2024

(30) Foreign Application Priority Data
Oct. 26, 2022 (CN) .......................... 202211318695.9

(51) Int. Cl.
*H02K 7/116* (2006.01)
*F03G 1/08* (2006.01)
*H02K 1/27* (2022.01)
*H02K 7/12* (2006.01)

(52) U.S. Cl.
CPC ............... *H02K 7/116* (2013.01); *F03G 1/08* (2013.01); *H02K 1/27* (2013.01); *H02K 7/12* (2013.01); *F05B 2220/7068* (2013.01); *F05B 2240/85* (2020.08)

(58) Field of Classification Search
CPC ............. H02K 7/116; H02K 1/27; H02K 7/12
USPC ....................................... 310/156.01
See application file for complete search history.

(56) References Cited

U.S. PATENT DOCUMENTS 5,363,445 A * 11/1994 Shyu .................... H02J 7/32
379/434

FOREIGN PATENT DOCUMENTS

| CN | 206636692 U | * | 11/2017 | |
|---|---|---|---|---|
| ES | 1204239 U | * | 1/2018 | |
| GB | 2347800 A | * | 9/2000 | ................ H02J 7/32 |

* cited by examiner

*Primary Examiner* — Jose A Gonzalez Quinones

(57) ABSTRACT

The invention discloses a convenient human and animal power drive permanent magnet power generation and storage system, comprising a grip power drive power generation system; the grip power drive power generation system is a dumbbell-shaped grip power generation device, comprising a grip handle and power generation devices provided at both ends of the grip handle; the power generation device is composed of a permanent magnet generator, a tensioning wheel, a spring sheet, a winder ratchet device, and a battery; folding buckles are provided between the power generation devices at both ends and the grip handle so as to be folded inward. The invention solves the problem of continuous power guarantee of wearable intelligent device; in the invention, the grip-type slow gear is designed as a spring tensioning device similar to a mechanical watch; the stress generated during the grip tightens the spring.

4 Claims, 3 Drawing Sheets

CONVENIENT HUMAN AND ANIMAL POWER DRIVE PERMANENT MAGNET POWER GENERATION AND STORAGE SYSTEM

1. TECHNICAL FIELD

The invention relates to the field of power generation devices, in particular to a convenient human and animal power drive permanent magnet power generation and storage system.

2. BACKGROUND ART

A wearable device is a portable device that is worn directly on the body or integrated into the user's clothing or accessories. The wearable device is not only a hardware device, but also realizes powerful functions through software support, data interaction, and cloud interaction. Wearable devices will bring great changes to our lives and perceptions. In recent years, various types of wearable electronic devices have been developed, such as smart watches, smart bracelets, smart necklaces, etc. The functions of wearable electronic devices have been gradually expanded, and the wearable electronic devices can perform various functions, such as phone calls, health management, alarm clocks, message confirmation, plan confirmation, and the like.

At present, the biggest shortcoming of wearable electronic devices is the problem of battery capacity, which usually needs to be charged once a day or charged more than once a day, which brings a lot of inconvenience to life.

In view of this, in order to meet the current trend of new energy and the power supply problem for wearable electronic devices, a convenient human and animal power drive permanent magnet power generation and storage system is proposed.

3. SUMMARY OF THE INVENTION

In order to solve the problems in the prior art, the invention provides a convenient human and animal power drive permanent magnet power generation and storage system. The invention is realized by the following technical solutions.

A convenient human and animal power drive permanent magnet power generation and storage system, comprising a grip power drive power generation system;

the grip power drive power generation system is a dumbbell-shaped grip power generation device, comprising a grip handle and power generation devices provided at both ends of the grip handle;

the power generation device is composed of a permanent magnet generator, a tensioning wheel, a spring sheet, a winder ratchet device, and a battery; the rotor of the permanent magnet generator is in meshing connection with the upper gear of the tensioning wheel, and the spring sheet is connected to the lower part of the tensioning wheel; the winder ratchet device is an annular chain to tighten the ratchet; the battery is provided in the grip handle, and its two output ends are electrically connected to the stator of the permanent magnet generator through a stator transmission line to store the current generated by the permanent magnet generator;

folding buckles are provided between the power generation devices at both ends and the grip handle so as to be folded inward.

Further, on the winder ratchet device, the positive and negative ratchets at both ends are driven by a chain; the ratchet wheel drives the coaxial shiftable gear, with two gears: fast and slow; the fast gear directly drives the rotor of the permanent magnet generator to rotate at a high speed to increase power, and the slow gear stiffens the spring sheet of the tensioning wheel to reserve the power to drive the rotor of the permanent magnet generator to continuously generate electricity.

Further, the human power drive mode of the power generation device includes a grip type, a hand-crank type, or a pedal type; in remote areas, the animal-power roulette drive mode is adopted to obtain greater and more sustainable power security.

Further, the convenient human and animal power drive permanent magnet power generation and storage system can be used for charging household appliances such as wearable electronic devices for long-term use.

The advantageous effects of the invention are: the invention solves the problem of continuous power guarantee of wearable intelligent device; in the invention, the grip-type slow gear is designed as a spring tensioning device similar to a mechanical watch; the stress generated during the grip tightens the spring, and when the stress is retracted, the spring is slowly released to drive a small permanent magnet generator; the generated electricity is stored wired or wirelessly into the battery for use by the wearable device; the invention is easy to carry, and the driving method is safe, reliable and effortless, and can be popularized and applied in a large area.

4. BRIEF DESCRIPTION OF ACCOMPANY DRAWINGS

5. SPECIFIC EMBODIMENT OF THE INVENTION

Figure 1:
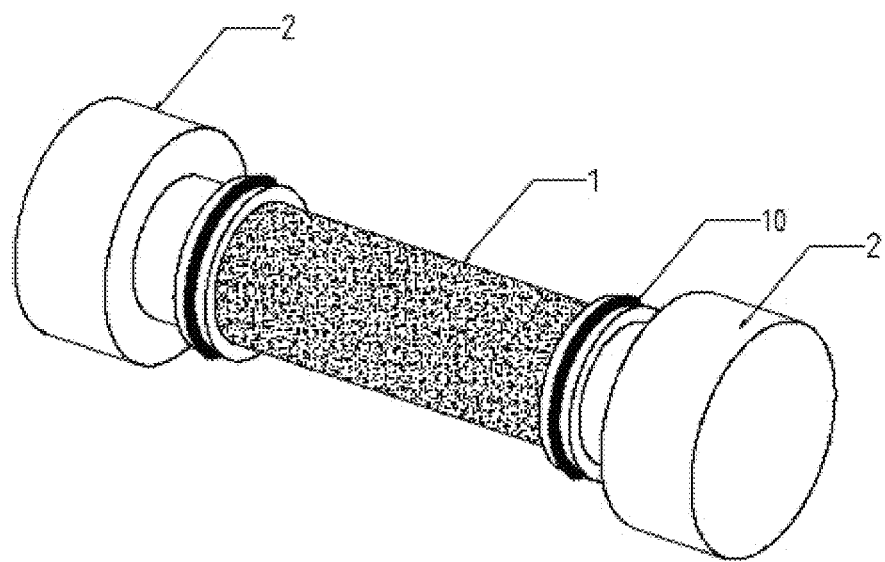
FIG. 1 is an external structure diagram of the power generation device according to the invention.
Figure 2:
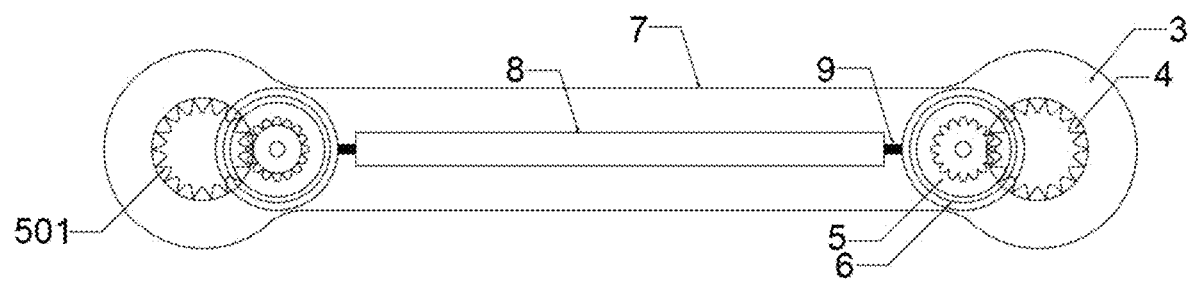
FIG. 2 is an internal plan view of the power generation device according to the invention.
Figure 3:
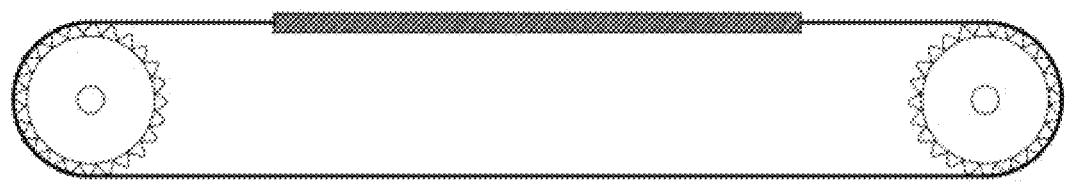
FIG. 3 is a schematic diagram of the grip power drive power generation system according to the invention.

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. The components of the embodiments of the invention generally described and illustrated in the drawings herein may be arranged and designed in a variety of different configurations.

In the description of the embodiments of the invention, it should be understood that the orientation or positional relationship indicated by the terms "upper", "lower", "front", "back, "left", "right", "inner", "outer", "vertical", "circumferential", "radial", "axial", etc. are based on the orientation or positional relationship shown in the drawings, and is only for the convenience of describing the invention and simplifying the description, but not indicate or imply that the pointed device or element must have a specific orientation, be constructed and operated in a specific orientation, and therefore cannot be understood as a limitation of the invention. In addition, the terms "first", "second", "third", etc. are only used to differentiate the description and should not be construed as indicating or implying relative importance.

Furthermore, the appearance of the terms "horizontal", "vertical", "overhanging" etc. does not imply that the component is required to be absolutely horizontal or overhanging, but may be slightly inclined. For example, "horizontal" only means that its direction is more horizontal than "vertical", it does not mean that the structure must be completely horizontal, but can be slightly inclined.

In the description of the embodiments of the invention, "a plurality of" means at least two. In the invention, unless otherwise clearly defined and limited, the terms "installed", "connected", "fixed" and other terms should be interpreted broadly; for example, it can be a fixed connection, a detachable connection or an integral connection; it can be a mechanical connection or an electrical connection; it can be a direct connection or an indirect connection through an intermediary, and it can be a connection between two components. For those of ordinary skill in the art, the specific meanings of the above terms in the invention can be understood according to specific circumstances.

Embodiment: a convenient human and animal power drive permanent magnet power generation and storage system, comprising a grip power drive power generation system;
the grip power drive power generation system is a dumbbell-shaped grip power generation device, comprising a grip handle 1 and power generation devices 2 provided at both ends of the grip handle 1;
the power generation device 2 is composed of a permanent magnet generator (stator 3 and rotor 4), a tensioning wheel 5, a spring sheet 6, a winder ratchet device 7, and a battery 8; the rotor 4 of the permanent magnet generator is in meshing connection with the upper gear 501 of the tensioning wheel 5, and the spring sheet 6 is connected to the lower part of the tensioning wheel 5; the winder ratchet device 7 is an annular chain to tighten the ratchet; the battery 8 is provided in the grip handle 1, and its two output ends are electrically connected to the stator of the permanent magnet generator through a stator transmission line 9 to store the current generated by the permanent magnet generator;
folding buckles 10 are provided between the power generation devices 2 at both ends and the grip handle 1 so as to be folded inward.

On the winder ratchet device 7, the positive and negative ratchets at both ends are driven by a chain; the ratchet wheel drives the coaxial shiftable gear, with two gears: fast and slow; the fast gear directly drives the rotor 4 of the permanent magnet generator to rotate at a high speed to increase power, and the slow gear stiffens the spring sheet 6 of the tensioning wheel to reserve the power to drive the rotor 4 of the permanent magnet generator to continuously generate electricity.

The human power drive mode of the power generation device 2 includes a grip type, a hand-crank type, or a pedal type; in remote areas, the animal-power roulette drive mode is adopted to obtain greater and more sustainable power security.

Principle: the convenient human and animal power drive permanent magnet power generation and storage system is used to charge household appliances such as wearable electronic devices for long-term use; human and animal power drives the permanent magnet material gear rotor, and the permanent magnet material stator coil generates magnetic line cutting to produce electricity, which solves the problem of power security for household appliances such as wearable smart devices; in the invention, the grip-type slow gear is designed as a spring tensioning device similar to a mechanical watch; the stress generated during the grip tightens the spring, and when the stress is retracted, the spring is slowly released to drive a small permanent magnet generator; the generated electricity is stored wired or wirelessly into the battery for continuous use by the wearable device.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

The invention claimed is:

1. A convenient human and animal power drive permanent magnet power generation and storage system, comprising a grip power drive power generation system, wherein:
the grip power drive power generation system is a dumbbell-shaped grip power generation device, comprising a grip handle and power generation devices provided at both ends of the grip handle;
the power generation device is composed of a permanent magnet generator, a tensioning wheel, a spring sheet, a winder ratchet device, and a battery; the rotor of the permanent magnet generator is in meshing connection with the upper gear of the tensioning wheel, and the spring sheet is connected to the lower part of the tensioning wheel; the winder ratchet device is an annular chain to tighten the ratchet; the battery is provided in the grip handle, and its two output ends are electrically connected to the stator of the permanent magnet generator through a stator transmission line to store the current generated by the permanent magnet generator;
folding buckles are provided between the power generation devices at both ends and the grip handle so as to be folded inward.

2. The convenient human and animal power drive permanent magnet power generation and storage system of claim 1, wherein on the winder ratchet device, the positive and negative ratchets at both ends are driven by a chain; the ratchet wheel drives the coaxial shiftable gear, with two gears: fast and slow; the fast gear directly drives the rotor of the permanent magnet generator to rotate at a high speed to increase power, and the slow gear stiffens the spring sheet of the tensioning wheel to reserve the power to drive the rotor of the permanent magnet generator to continuously generate electricity.

3. The convenient human and animal power drive permanent magnet power generation and storage system of claim 1, wherein the human power drive mode of the power generation device includes a grip type, a hand-crank type, or a pedal type; in remote areas, the animal-power roulette drive mode is adopted to obtain greater and more sustainable power security.

4. The convenient human and animal power drive permanent magnet power generation and storage system of claim 1, wherein the convenient human and animal power drive permanent magnet power generation and storage system can be used for charging household appliances such as wearable electronic devices for long-term use.

* * * * *